United States Patent [19]
Munetsugu

[11] Patent Number: 5,745,774
[45] Date of Patent: Apr. 28, 1998

[54] INTEGRATED CIRCUIT HAVING SOFTWARE CONTROLLABLE INTERNAL CLOCK GENERATOR AND SWITCH CONNECTING BATTERIES IN SERIES OR PARALLEL FOR POWER CONSERVATION

[75] Inventor: Eiichi Munetsugu, Yokohama, Japan

[73] Assignee: Kabushiki Kaisha Toshiba, Kawasaki, Japan

[21] Appl. No.: 757,951

[22] Filed: Nov. 22, 1996

Related U.S. Application Data

[63] Continuation of Ser. No. 965,854, Oct. 23, 1992, abandoned.

[30] Foreign Application Priority Data

Oct. 25, 1991 [JP] Japan .................................. 3-279097

[51] Int. Cl.$^6$ ........................................................ G06F 1/08
[52] U.S. Cl. ........................... 395/750.04; 395/750.03; 395/551; 395/556; 395/800.38; 395/800.43
[58] Field of Search .................................. 395/750, 555, 395/551, 750.03, 750.04, 750.02, 800.38, 800.43

[56] References Cited

U.S. PATENT DOCUMENTS

| | | | |
|---|---|---|---|
| 3,748,500 | 7/1973 | Tam | 327/526 |
| 3,871,383 | 3/1975 | Lee | 307/71 |
| 4,039,909 | 8/1977 | Baker | 318/197 |
| 4,081,738 | 3/1978 | Roller | 320/7 |
| 4,315,162 | 2/1982 | Ferguson | 307/66 |
| 4,328,456 | 5/1982 | Suzuki et al. | 320/7 |
| 4,365,290 | 12/1982 | Nelms et al. | 364/707 |
| 4,788,452 | 11/1988 | Stanley | 307/71 |
| 4,881,205 | 11/1989 | Aihara | 365/222 |
| 4,893,271 | 1/1990 | Davis et al. | 395/550 |
| 5,007,793 | 4/1991 | Irvin | 414/502 |
| 5,021,679 | 6/1991 | Fairbanks et al. | 307/66 |
| 5,305,451 | 4/1994 | Chao et al. | 395/555 |
| 5,428,790 | 6/1995 | Harper et al. | 395/750 |

FOREIGN PATENT DOCUMENTS

WO 90/13079 11/1990 WIPO.
WO 91/00564 1/1991 WIPO.

*Primary Examiner*—Dinh C. Dung
*Attorney, Agent, or Firm*—Oblon, Spivak, McClelland, Maier & Neustadt, P.C.

[57] ABSTRACT

An integrated circuit of this invention includes a processor, a first circuit for generating a clock signal, and a second circuit for selecting a suitable line voltage. The first circuit generates at least two kinds of clock signals. When one kind of clock signal having a high frequency is selected for use, the processor gives an instruction to the second circuit so as to change the connection between external batteries, and so, to obtain a high line voltage. On the contrary, when the other kind of clock signal having a low frequency is selected for use, said processor gives an instruction to the second circuit so as to change the connection between the batteries, and so, to obtain a low line voltage.

4 Claims, 2 Drawing Sheets

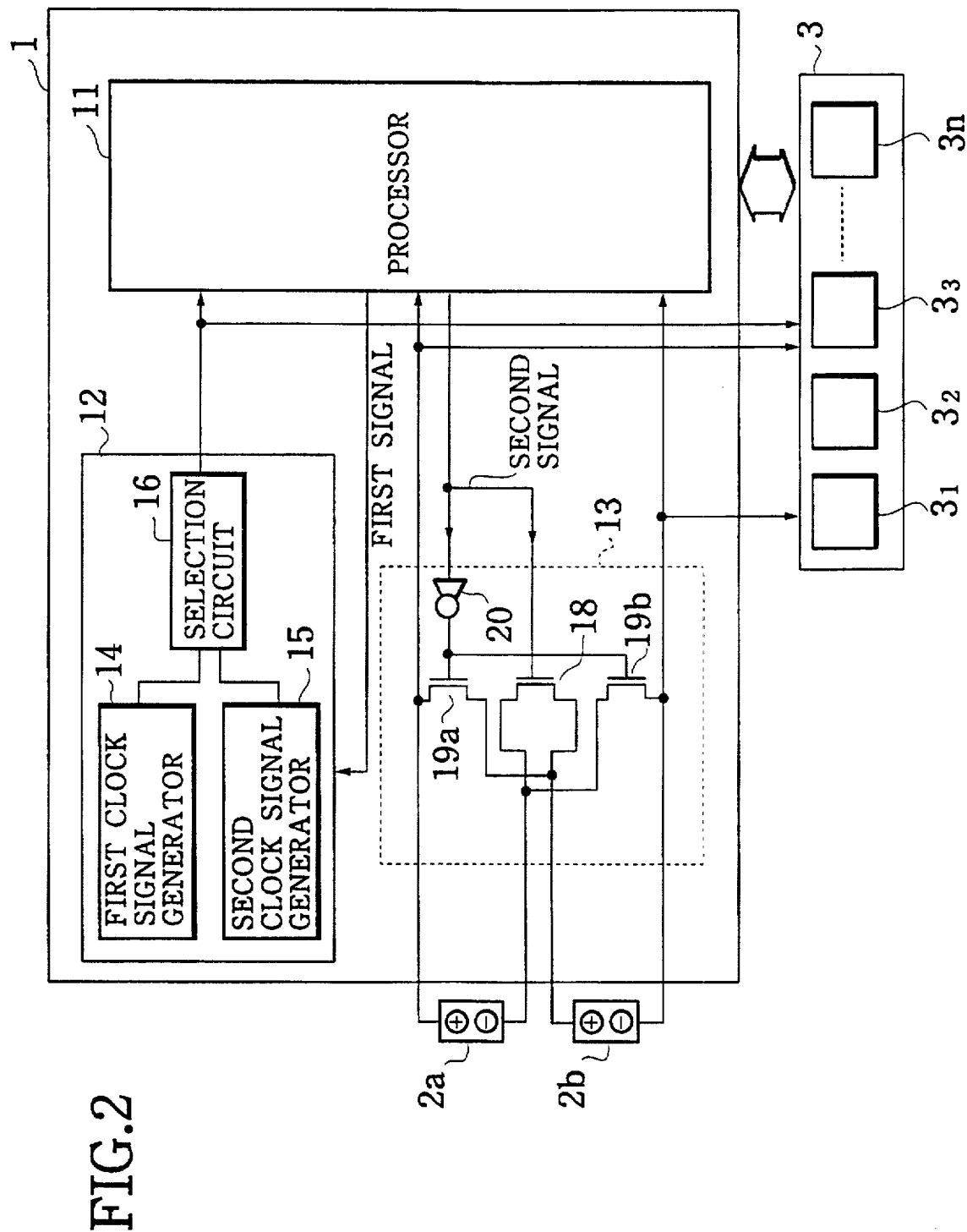

INTEGRATED CIRCUIT HAVING SOFTWARE CONTROLLABLE INTERNAL CLOCK GENERATOR AND SWITCH CONNECTING BATTERIES IN SERIES OR PARALLEL FOR POWER CONSERVATION

This application is a Continuation Ser. No. 07/965,854, filed on Oct. 23, 1992, now abandoned.

BACKGROUND OF THE INVENTION

1. Field of the Invention

This invention relates to an integrated circuit for use in an electronic apparatus in which high speed operation is required by battery drive. This invention also relates to the electronic apparatus itself.

2. Description of the Prior Art

In portable type electronic apparatus such as an electronic calculator, an electronic memo, a personal computer, and a portable telephone, batteries having small capacity should be used as power supplies, in order to reduce the whole size and the weight of the apparatus. Therefore, in order to use these apparatus for a long time without changing batteries, that is, to increase the life time of batteries, it is very important to reduce the power consumption in these apparatus.

To realize the reduction of power consumption in those apparatus, processes, in which high speed operation is not required, are executed with a clock signal having a lower frequency than that of the clock signal for use in processings in which high speed operation is required. Thus, to reduce the power consumption in a prior art electronic apparatus having small capacity of batteries, the frequency of an operational clock signal is made to change according to the speed of processings.

On the other hand, high speed operation is strongly required in said apparatus as well as to improve its function. Therefore, a processing which requires a high speed operation is executed in synchronism to an operational clock signal having a higher frequency than that of the clock signal for use in a processing which does not require a high speed operation. However, in the case where a high frequency clock signal is used to execute a process, considerably high line voltage is required. This is because the operational frequency characteristic of an integrated circuit depends on its line voltage. In other words, raising the frequency of an operational clock signal requires increasing the line voltage.

Because of the above mentioned reason, in a prior art, the line voltage of an electronic apparatus was fixed to a certain voltage level which corresponds to an operational clock signal used in processings in which high speed operation is required. As a result, the line voltage of the whole apparatus has become higher than that of corresponding to an operational clock signal used in processings in which high speed operation is not required.

The power consumption of an electronic apparatus is proportional to the product of a line voltage value and a clock signal frequency. Consequently, even if a low frequency was selected to be the clock signal frequency in order to execute processings in which high speed operation is not required, the power consumption could not be largely reduced. This is because the line voltage was fixed to a high level for use in processings in which high speed operation is required. As a result, contrary to the expectation, the life time of a battery could not be largely improved.

The above mentioned fact causes a big difficulty in making small and light weight an electronic system, such as a personal computer.

As described above, in a prior art electronic apparatus having small capacity of batteries as a power source, the line voltage of an integrated circuit was fixed to a high level. Therefore, even if the frequency of an operational clock signal was made to change according to the processing speed, the power consumption could not be improved to the expected value.

SUMMARY OF THE INVENTION

The present invention has been made to overcome the above mentioned problems of the prior arts.

Therefore, the main objective of the present invention is to provide an integrated circuit which is able to cope with high speed operation with greatly reducing the power consumption.

Another objective of the present invention is to provide a useful electronic apparatus which can be made small in size and light in weight, and which can be used for a long time without changing batteries.

The first feature of the present invention provides an integrated circuit which is comprised of the following: processing means for executing predetermined processes with synchronous to an operational clock signal, said processing means generating a first signal for specifying the frequency of said operational clock signal and a second signal for selecting a line voltage which is required to generate said operational clock signal having said frequency specified by said first signal; means for supplying an operational clock signal having the frequency specified by said first signal into said processing means in response to the input of said first signal from said processing means; and means for selecting a suitable line voltage by changing the connection between external batteries in response to said second signal obtained from said processing means, and for supplying said selected line voltage into said processing means.

According to said first feature of the present invention, the line voltage of the integrated circuit can be varied in response to the frequency change of an operational clock signal. Therefore, when an operational clock signal having a relatively low frequency is selected to be used in said processing means, a low line voltage can be selected so as to save the power consumption of the integrated circuit.

The second feature of the present invention provides an electronic device which is comprised of the following: at least two batteries; a processor for executing predetermined processes with synchronous to an operational clock signal, said processor generating a first signal for specifying the frequency of said operational clock signal and a second signal for selecting a line voltage value which is required to obtain said operational clock signal having said frequency selected by said first signal; a first circuit for supplying an operational clock signal having the frequency specified by said first signal into said processor in response to the input of said first signal from said processor; and a second circuit for selecting a suitable line voltage by changing the connection between said batteries in response to said second signal obtained from said processor, and for supplying said selected line voltage into said processor.

In said second feature, said processor, said first circuit, and said second circuit may be formed in one integrated circuit.

According to said second feature of the present invention, an electronic apparatus which can be used for a long time without changing batteries is obtained. Also, this apparatus can be made smaller in size and lighter in weight as compared with prior art apparatus.

These and other objectives, features, and advantages of the present invention will be more apparent from the following detailed description of preferred embodiments in conjunction with the accompanying drawings.

BRIEF DESCRIPTION OF THE DRAWINGS

FIG. 2 is a block diagram showing the main part of an electronic apparatus in which an integrated circuit according to another embodiment of the present invention is included.

DETAILED DESCRIPTION OF PREFERRED EMBODIMENTS

Figure 1:
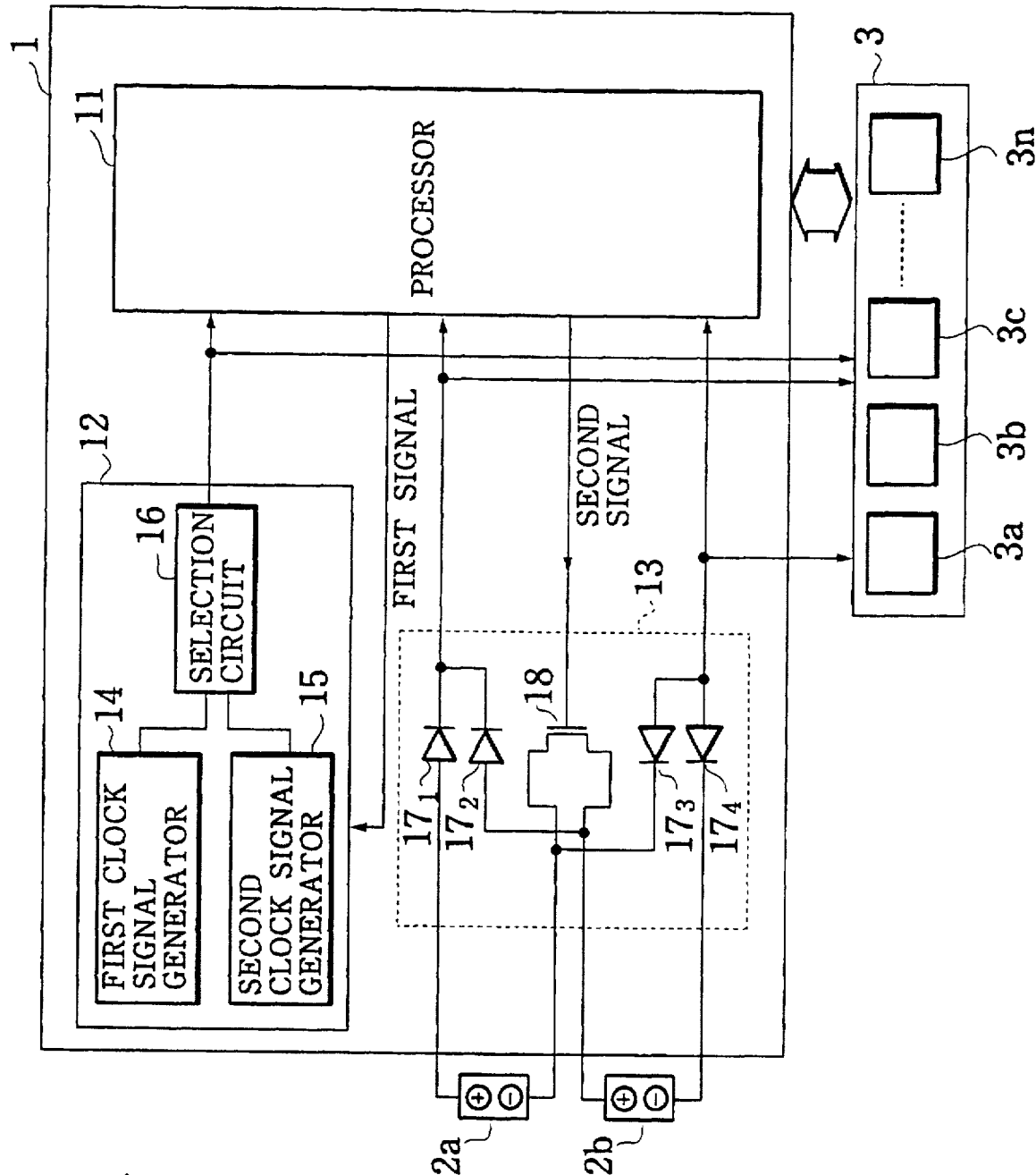
FIG. 1 is a block diagram showing the main part of an electronic apparatus in which an integrated circuit according to one embodiment of the present invention is included.

FIG. 1 shows the main part structure of an electric apparatus in which the integrated circuit according to one embodiment of the present invention is included. As shown in the figure, the apparatus is comprised of the following: an integrated circuit 1; two batteries 2a and 2b; and a plurality of optional integrated circuits 3a, 3b, . . . 3n. In this apparatus, the connection between batteries 2a and 2b is made to change so as to select a certain line voltage which corresponds to the frequency change of an operational clock signal used in circuit 1. The selected line voltage and the operational clock signal used in integrated circuit 1 are also supplied to other integrated circuits 3a, 3b, . . . , and 3n.

Integrated circuit 1, which features the present invention, is comprised of the following as shown in FIG. 1: a processor 11 to execute predetermined processings according to programs with synchronous to an operational clock signal; a first circuit 12 for supplying an operational clock signal into processor 11; a second circuit 13 for selecting a suitable line voltage, which is applied to processor 11, by changing the connection between two batteries placed outside integrated circuit 1. These two batteries are placed outside the circuit 1 and work as a power supply for the electronic apparatus.

During the execution of programs, processor 11 outputs a first signal to specify the frequency of an operational clock signal corresponding to respective processings, one of which requires a high speed operation and another of which does not require a high speed operation. This first signal is previously set in a program according to the operation speed which is required by a processing to be executed. In order to execute a processing in which a high speed operation is required, a clock signal having a relatively high frequency is specified by the program. On the other hand, in order to execute a processing in which a high speed operation is not required, a clock signal having a relatively low frequency is specified.

Processor 11 also outputs a second signal to select a line voltage by changing the connection between batteries 2a and 2b. This selection is carried out according to the frequency change of the clock signal which has been set by said first signal. In the case where the frequency of a clock signal is high, the second signal indicates to connect batteries 2a and 2b in series with each other so as to obtain a high line voltage. On the other hand, when the frequency of a clock signal is low, the second signal indicates to connect batteries 2a and 2b in parallel with each other so as to obtain a low line voltage.

When the operational clock signal changes its frequency from a low level to a high level by the first signal, the second signal is output simultaneously, or immediately prior to the change, so as to connect batteries 2a and 2b in series. On the contrary, when the operational clock signal changes its frequency from the high level to the low level by said first signal, the second signal is output simultaneously, or immediately after the change, so as to connect batteries 2a and 2b in parallel.

As explained above, the first signal obtained from processor 11 is applied into the first circuit 12 for supplying an operational clock signal, while the second signal is applied into the second circuit 13 for selecting the line voltage.

The first circuit 12 for supplying an operational clock signal is comprised of the following: a first generator 14 to produce a clock signal having a relatively high frequency for use in a high speed operation; a second generator 15 to produce a clock signal having a relatively low frequency for use in a processing which does not require a high speed operation; and a selection circuit 16 for the clock signals produced in generators 14 and 15.

Selection circuit 16 chooses an operational clock signal produced in generator 14 when the first signal from processor 11 claims the clock signal having a high frequency for use in a high speed operation. On the other hand, if the first signal claims the clock signal having a relatively low frequency, selection circuit 16 chooses the clock signal produced in generator 15. The clock signal chosen by selection circuit 16 is, then, given to processor 11 as an operational clock signal. Selection circuit 16 carries out the switching of signals between generators 14 and 15, by matching the phase of each signal which has a different frequency to the other. Therefore, the frequency of an operational clock signal does not deviate even just after the frequency change, thus causing no ill effect for executing a processing.

The second circuit 13 for selecting a line voltage is comprised of four diodes 17a, 17b, 17c, and 17d and a switch 18 which is made of a MOS transistor. This switch 18 is allowed to conduct according to the control by the second signal, thus changing the connection between batteries 2a and 2b.

When processor 11 wants to change the frequency of its operational clock signal from a low level to a high level, a second signal is given by processor 11 to switch 18 in the second circuit 13, thus allowing switch 18 to conduct. As a result, batteries 2a and 2b are connected in series so as to supply a high level voltage into processor 11.

On the other hand, when processor 11 wants to change the frequency of its operational clock signal from a high level to a low level, the second signal is given by processor 11 into switch 18 in the second circuit 13, thus allowing switch 18 to become non-conductive. As a result, batteries 2a and 2b are connected in parallel so as to supply a low line voltage into processor 11.

As described above, the line voltage in said embodiment is made to change according to the frequency change of the operational clock signal. Therefore, in the case where a high speed operation is required, that is, a high frequency clock signal should be used, the line voltage of a high level is selected to be used for executing a processing, thus enabling a high speed operation. On the other hand, in the case where a high speed operation is not required, that is, a relatively low frequency is used for the clock signal, the line voltage ‘of a low level is selected to be used for executing a processing, thus largely reducing the power consumption as compared with that of the prior art device in which its line voltage is fixed to a certain value.

Consequently, the service life of batteries which are used to be the power supply can be greatly improved in this embodiment. This fact also enables to reduce the size of the power supply. Therefore, an electronic apparatus, in which the above mentioned integrated circuit is used, can be made smaller and lighter.

FIG. 2 shows another embodiment of the present invention. In this figure, numbers as those of shown in FIG. 1 indicate the same structure elements, so that their explanation will be omitted.

The embodiment shown in FIG. 2 is characterized by the structure of a circuit 13' for selecting a line voltage. In this circuit 13', MOS transistor switches 19a and 19b are used instead of diodes 17a to 17d in circuit 13 shown in FIG. 1. In order to change the connection between batteries 2a and 2b, these switches 19a and 19b are controlled to conduct by the output from inverter 20 in which the first signal obtained from processor 11 is inverted. In this embodiment, of course, the same advantages as those obtained from the first embodiment can also be obtained.

This invention is not limited to the embodiments explained above. For example, the first circuit 13 or 13' for selecting a line voltage can be placed outside integrated circuit 1. In the case where a low line voltage is supplied to processor 11, only one battery may be used to supply the line voltage into processor 11, by dissolving the series connection of batteries. Also, it is possible to use only integrated circuit 1 to compose an electronic apparatus, without using optional integrated circuits 3a, 3b, and so on.

In summary, according to the present invention, the frequency of an operational clock signal should be varied due to the change of processing speed. At the same time, the line voltage is varied in accordance with the frequency change of the operational clock signal. As a result, this invention is able to manage a processing which requires a high speed operation, with greatly reducing the power consumption as compared with that of the prior art device. Therefore, the service life of the batteries, which are used to be a power source, can be greatly extended as compared with that of the prior art. This fact also allows to reduce the whole size of a power source, and therefore, to reduce the size and the weight of an electronic apparatus.

Various modifications will become possible for those skilled in the art after receiving the teachings of the present disclosure without departing from the scope thereof.

What is claimed is:

1. An electric apparatus comprising:
    a plurality of batteries;
    an integrated circuit connected to said plurality of batteries and including,
        a processor for executing a program and outputting a first signal and a second signal,
        a clock generator connected to said processor for selectively generating a first clock signal and a second clock signal having a frequency lower than said first clock signal in response to said first signal, a
        a connection circuit connected to said batteries and said processor for changing a serial and parallel connection between said batteries in response to said second signal for supplying said processor with a selected voltage from said batteries through said connection circuit;
    an optional circuit connected to said integrated circuit for receiving one of said first clock signal and said second clock signal from said clock generator and said selected voltage from said batteries which are coupled in parallel or in series in accordance with said second signal,
    wherein said integrated circuit outputs either one of said first clock signal and said second clock signal together with said selected voltage in accordance with execution of the program in order that said first clock signal and said selected voltage are supplied to said processor and said optional circuit at the same time that said batteries are coupled in series while said second clock signal and said selected voltage are supplied to said processor and said optional circuit at the same time that said batteries are coupled in parallel.

2. The electric apparatus as claimed in claim 1, wherein said processor is provided with a switching signal line within said integrated circuit for supplying said second signal to a gate of a transistor whose switching operation entails a hardwired change of the serial and parallel connection between said batteries.

3. The electric apparatus according to claim 2, wherein the clock generator comprises a first generator which generates the first clock signal and a second generator which generates the second clock signal.

4. The electric apparatus according to claim 2, wherein the clock generator comprises a first generator which generates the first clock signal and a second generator which generates the second clock signal.

* * * * *